United States Patent [19]
Maruta

[11] Patent Number: 6,006,872
[45] Date of Patent: Dec. 28, 1999

[54] BRAKING APPARATUS FOR A HYDRAULIC MOTOR

[75] Inventor: Kazuhiro Maruta, Tochigi-ken, Japan

[73] Assignee: Komatsu Ltd., Tokyo, Japan

[21] Appl. No.: 08/849,574

[22] PCT Filed: Dec. 26, 1995

[86] PCT No.: PCT/JP95/02701

§ 371 Date: Jun. 20, 1997

§ 102(e) Date: Jun. 20, 1997

[87] PCT Pub. No.: WO96/20355

PCT Pub. Date: Jul. 4, 1996

[30] Foreign Application Priority Data

Dec. 27, 1994 [JP] Japan .................................. 6-325086

[51] Int. Cl.$^6$ .................................................. F16D 65/24
[52] U.S. Cl. .......................................... 188/170; 477/199
[58] Field of Search .................................. 188/71.5, 170, 188/72.4; 477/199

[56] References Cited

U.S. PATENT DOCUMENTS

| | | | |
|---|---|---|---|
| 3,680,666 | 8/1972 | Sommer | 188/71.5 X |
| 3,759,357 | 9/1973 | Bianchetta | 188/170 X |
| 4,254,845 | 3/1981 | Braun | 188/170 X |
| 4,263,991 | 4/1981 | Morgan et al. | 188/170 |
| 4,415,067 | 11/1983 | Cory | 188/71.5 |
| 4,604,915 | 8/1986 | Soffge et al. | 188/170 X |
| 4,607,730 | 8/1986 | Paisley | 188/71.5 X |
| 4,813,518 | 3/1989 | Akiyama et al. | 188/170 |
| 5,114,324 | 5/1992 | Spindledreher | 188/170 X |
| 5,186,284 | 2/1993 | Lamela et al. | 188/170 X |
| 5,601,160 | 2/1997 | Horsch | 188/71.5 |

FOREIGN PATENT DOCUMENTS

| | | |
|---|---|---|
| 0 119 884 | 9/1984 | European Pat. Off. . |
| 0 567 736 | 11/1993 | European Pat. Off. . |
| 41 04 712 | 8/1992 | Germany . |
| 60-87882 | 6/1985 | Japan . |
| 61-6404 | 1/1986 | Japan . |
| 61-93641 | 6/1986 | Japan . |
| 62-100306 | 6/1987 | Japan . |
| 2-126933 | 10/1990 | Japan . |
| 2-248724 | 10/1990 | Japan . |

Primary Examiner—Robert L. Oberleitner
Assistant Examiner—Pamela J. Lipka
Attorney, Agent, or Firm—Wenderoth, Lind & Ponack, L.L.P.

[57] ABSTRACT

A braking apparatus for a hydraulic motor has a housing and a cylinder block. The apparatus includes fixed side frictional plates mounted to the housing and movable side frictional plates mounted to the cylinder block. In addition, a piston for pressing the fixed side frictional plates against the movable side frictional plates is also provided. A spring for thrusting the piston to move in a first direction thus tending to establish a first state in which the two sets of frictional plates are pressed together is also included. Furthermore, the apparatus includes a piston driving pressure receiving chamber disposed between the housing and the piston for thrusting the piston to move in a second direction under a pressure that is introduced into the piston driving pressure receiving chamber to establish a second state in which the two sets of frictional plates are separated from each other. The apparatus also includes a stopper for regulating a space between the fixed side frictional plates and the movable side frictional plates while the piston is moving in the second direction. In addition, the piston is movable in the second direction a distance that is greater than the size of the space.

9 Claims, 3 Drawing Sheets

BRAKING APPARATUS FOR A HYDRAULIC MOTOR

TECHNICAL FIELD

The present invention relates to a braking apparatus for a hydraulic motor, which may be a hydraulic motor for turning, used in a hydraulic power shovel or the like.

BACKGROUND ART

A hydraulic motor has, in general, a shaft rotatably supported in a casing. The shaft in turn is coupled to a cylinder block which is rotatable therewith. The cylinder block is formed with a plurality of cylinder bores which are circumferentially spaced apart from one another and in parallel to the shaft. Each of the cylinder bores has a piston slidably inserted therein, thus defining a cylindrical chamber between the piston and an end of the cylinder bore. Also, the above mentioned shaft has a thrust ball coupled thereto, which in turn has a shoe inserted therein so as to be inclined with respect to the shaft by extending along a swash plate. The thrust ball and the shoe are designed to be rotatable with the shaft while being energized towards the above mentioned swash plate by a spring. Further, each of the above mentioned pistons has a front end connected with the shoe via a universal coupling thereto. If the pistons are reciprocated by supplying and draining a pressure fluid from a hydraulic pressure source into and out of a pressure receiving chamber of each cylinder bore the above mentioned swash plate and shoe will guide the pistons circumferentially causing the shaft and the cylinder block to rotate together.

Also, a braking apparatus for the above mentioned hydraulic motor has a plurality of movable side frictional plates and a plurality of fixed side frictional plates mounted to the cylinder block and housing, respectively, so that they are alternately mounted with respect to one another in a direction which is parallel to the above mentioned shaft. Opposite the frictional plates is provided a piston that is adapted to be pushed towards a first side of the frictional plates by a spring and to be pushed towards a second side opposite the first side by a pressure fluid in a piston driving pressure receiving chamber. Using the spring to push the piston causes pressure contact between the fixed side frictional plates and the moveable side frictional plates. As a result, the rotational speed of the cylinder is reduced and is eventually rendered incapable of being rotated. In contrast, supplying the piston driving pressure receiving chamber with a pressure fluid causes the piston to move against the spring. As a result, the fixed side frictional plates and the movable side frictional plates are moved apart from one another. Consequently, braking force is not applied to the cylinder block and thus it is capable of being rotated.

In such a braking apparatus for a hydraulic motor in which the non-braking state is established by supplying the piston driving pressure receiving chamber with the pressure fluid and in which braking force is established by draining the pressure fluid from the piston driving pressure receiving chamber, it can be seen that the time required to switch from the non-braking state to the braking state is determined by the distance and the velocity of movement of the piston (i.e., the time required to drain the pressure fluid from the piston driving pressure receiving chamber).

The time required to drain the pressure fluid from the above mentioned piston driving pressure receiving chamber is determined by a difference between a volume of the fluid in the chamber during the non-braking state and a volume of the fluid in the chamber during the braking state, that is, an effective volume in the piston driving pressure receiving chamber and a velocity of draining the pressure fluid out.

On the other hand, in the case of a hydraulic motor for turning an upper vehicle body in a hydraulic power shovel, it has been observed that after the hydraulic motor is stopped by returning an operating valve to a neutral position the hydraulic motor will continue to rotate a number of times due to an inertia of the upper vehicle body.

For this reason, if the braking apparatus is brought into a braking state at the same time the hydraulic motor is stopped, a large braking force will be applied to the hydraulic motor which may damage the hydraulic motor and shock the apparatus. In order to avoid such inconveniences, the braking apparatus must be operated or brought into the braking state a short period of time or delay after the hydraulic motor is intended to be stopped.

Accordingly, it has hitherto been customary to provide the piston driving pressure receiving chamber in a pressure fluid supply circuit thereof with a check valve and a slow return valve that is capable of allowing a pressure fluid to flow smoothly into the piston driving pressure receiving chamber to establish the non-braking state in a short period of time and on the other hand also capable of allowing the pressure fluid in the piston driving pressure receiving chamber to slowly flow out through a restriction (i.e., a small opening) to bring the braking apparatus slowly into the braking state.

By the way, it should be noted that the braking apparatus in the prior art has been so constructed that if a braking force is not generated, the spacing between the fixed side frictional plates and the movable side frictional plates may be regulated by the piston. This will reduce both the difference in position of the piston between the braking state and the non-braking state (a movement distance of the piston) and the effective volume of the piston, thus requiring the above mentioned restriction to have an extremely small opening area so that the piston will move slowly. As a result, the time period up to the point at which the braking state is established will be lengthened.

In other words, if the above mentioned piston movement distance is increased, it follows that the spacing between the fixed side frictional plates and the movable side frictional plates will be increased and rotation or vibration thereof may cause a backlash in either of the fixed side or the movable side frictional plates. This may cause the moveable side frictional plates to be inclined to fit onto the cylinder block or warped, and may damage such frictional plates during the braking state and result in the generation of an insufficient braking force. For these reasons, it has hitherto been customary to leave a small space between the fixed side frictional plates and the movable side frictional plates.

It has been recognized, however, that with these measures, a machining problem occurs when fabricating a structure having the small restriction or aperture as mentioned above. In addition, fluctuation in the area of the aperture arises from limitations of the attainable machining accuracy and the structure is influenced greatly by changes in the fluid temperature of the high pressure fluid. As a result, an increased fluctuation in the period of time required to bring the braking apparatus into the braking state occurs.

It should be noted at this point that if the piston is increased in diameter its effective volume will also be increased. However, this will then require the size of the housing to be increased, thus eventually enlarging the entire hydraulic motor.

Also, there has hitherto been a proposal to resolve the inconveniences in a case where a slow return valve as mentioned above is utilized, whereby there is provided an electromagnetic valve that is designed to establish and to block communication of the piston driving pressure receiving chamber of the braking apparatus with a hydraulic pressure source and a reservoir. Also, a controller is utilized which is designed to electrically energize the electromagnetic valve after a predetermined period of time after the controller has been supplied with a signal indicative of the fact that steps have been taken to stop the hydraulic motor. The electromagnetic valve is electrically energized by the controller to allow the piston driving pressure receiving chamber to communicate with the reservoir to bring the braking apparatus into a desired braking state.

However, such a construction which requires an electromagnetic valve and a controller as mentioned above is very expensive to manufacture.

It is, accordingly, an object of the present invention to provide a braking apparatus for a hydraulic motor, which is capable of slowly shifting from a non-braking state to a braking state, and which does not require a large hydraulic motor and which is relatively less expensive to produce.

SUMMARY OF THE INVENTION

In order to achieve the object mentioned above, there is provided in accordance with the present invention, in a first general aspect thereof, a braking apparatus for a hydraulic motor having a housing and a cylinder block. The apparatus comprises fixed side frictional plates mounted to the housing and movable side frictional plates mounted to the cylinder block. In addition, a piston for pressuring the fixed side frictional plates against the movable side frictional plates is provided. A spring for thrusting the piston to move in a first direction thus tending to establish a first state in which the two sets of frictional plates are pressed together is also provided. Furthermore, the apparatus includes a piston driving pressure receiving chamber disposed between the housing and the piston for thrusting the piston to move in a second direction under a pressure that is introduced into the piston driving pressure receiving chamber to establish a second state in which the two sets of frictional plates are separated from each other.

The apparatus also includes a stopper for regulating a space between the fixed side frictional plates and the movable side frictional plates while the piston is moving in the second direction. In addition, the piston is movable in the second direction a distance that is greater than the size of the space.

According to the construction mentioned above, it can be seen that it is possible to enlarge the stroke (distance) by which the piston is moved in a direction which allows the fixed side frictional plates and the movable side frictional plates to be separated from each other without enlarging the space between them resulting in the increase of the effective volume of the piston driving pressure receiving chamber. Thus, since an increased amount of pressure fluid has entered the piston driving pressure receiving chamber during the non-braking state, it will take a longer time for the pressure fluid to flow out of the piston driving pressure receiving chamber and consequently it will then take a proportionally longer amount of time for a braking state to be reached. Also, since the effective volume of the piston driving pressure receiving chamber is made greater, it will become unnecessary to reduce the area of the restriction by much. For example, it is possible to use an orifice restriction of a diameter not less than 0.5 mm, thus permitting the fluctuation in the time period before a braking state is reached to be minimized. Further, because the piston need not be large in diameter, the entire hydraulic motor will not need to be increased in size.

In the construction mentioned above, it should be noted that it is preferred that there should be provided a directional control valve for supplying the hydraulic motor with a pressure fluid. In addition, there should also be provided a sensing circuit connected to the piston driving pressure receiving chamber for detecting a load pressure from the directional control valve and permitting the piston to be driven under the load pressure.

Also, in the construction mentioned above, it is possible that there may be provided a directional control valve for supplying the hydraulic motor with a pressure fluid. It may also be possible to provide a hydraulic pilot valve having an output side connected to the piston driving pressure receiving chamber for switching the directional control valve with a pilot pressure fluid that is furnished therefrom and permitting the piston to be driven under the pilot pressure.

According to each of the constructions mentioned in the preceding paragraphs, it can be seen that the use of the load pressure or the pilot pressure makes it unnecessary to include a switching valve and so forth, and thus reduces manufacturing expenses.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention but to facilitate an explanation and understanding thereof.

In the accompanying drawings.

DETAILED DESCRIPTION OF THE INVENTION

Embodiments of the present invention with respect to a braking apparatus for a hydraulic motor will now be set forth with reference to the accompanying drawings.

Figure 1:
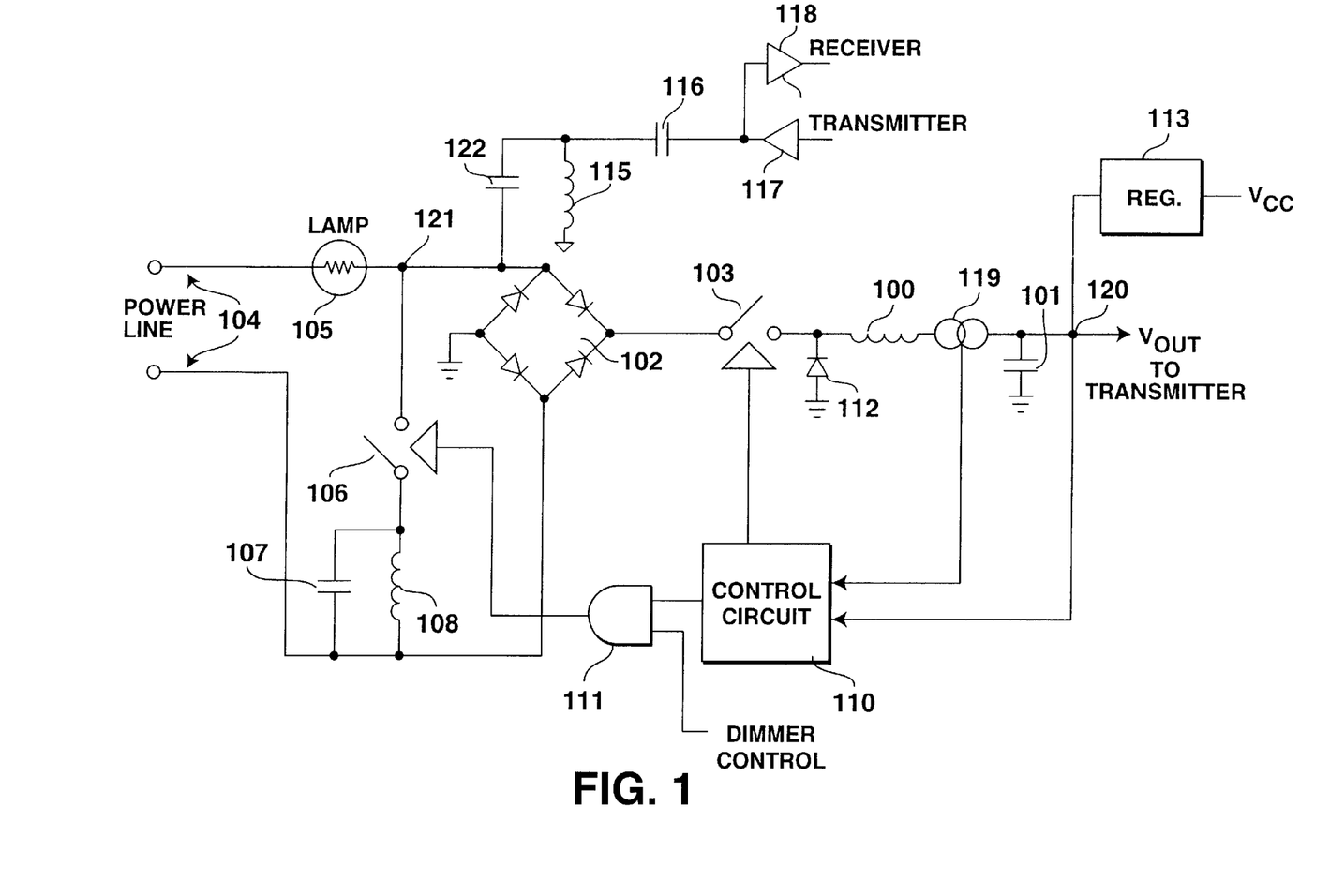
FIG. 1 is a longitudinal cross sectional view that shows a hydraulic motor incorporating a first embodiment of the braking apparatus according to the present invention.

As shown in FIG. 1, a cylindrical casing 1 and an end plate 2 are joined together to constitute a motor housing 3 in which a shaft 5 is rotatably supported. A cylinder block 4 is spline coupled to the shaft 5 so as to be rotatable therewith. The cylinder block 4 is formed with a plurality of cylindrical bores 6 spaced apart from one another circumferentially. Each bore 6 extends parallelly to the shaft 5. Each of the cylindrical bores 6 has a piston 7 slidably inserted therein. Also, the shaft 5 has a thrust ball 32 spline coupled thereto. The trust ball 32, in turn, has a shoe 9 fitted thereon that is inclined with respect to the shaft 5 by extending along a swash plate 10 so that the thrust ball 32 and the shoe 9 are rotatable together with the shaft 5. In addition, a spring 34 and a pin 35 are interposed between the thrust ball 32 and the cylinder block 4 to energize the thrust ball 32 and the shoe 9 towards the swash plate 10. Also, each piston 7 has a forward end that is universally coupled to the shoe 9 via a ball 31. By supplying and draining a pressure fluid from a hydraulic fluid source (not shown) into and out of a pressure receiving chamber 8 in each cylindrical bore 6 to reciprocate the pistons 7, the swash plate 10 and the shoe 9 together act to guide the pistons 7 circumferentially so as to rotate the shaft 5 as well as the cylinder block 4. It is with these components that the hydraulic motor is basically constituted.

Also, the inner surface of the above mentioned casing 1 has a stepped configuration with a small diameter inner surface 11, a middle diameter inner surface 12 and a large diameter inner surface 13. The small diameter inner surface 11 and the outer surface 4a of the cylinder block 4 have a plurality of fixed side frictional plates 14 and a plurality of movable side frictional plates 15 mounted thereto, respectively, so that they may be arranged alternately in a direction parallel to the shaft 5.

Figure 2:
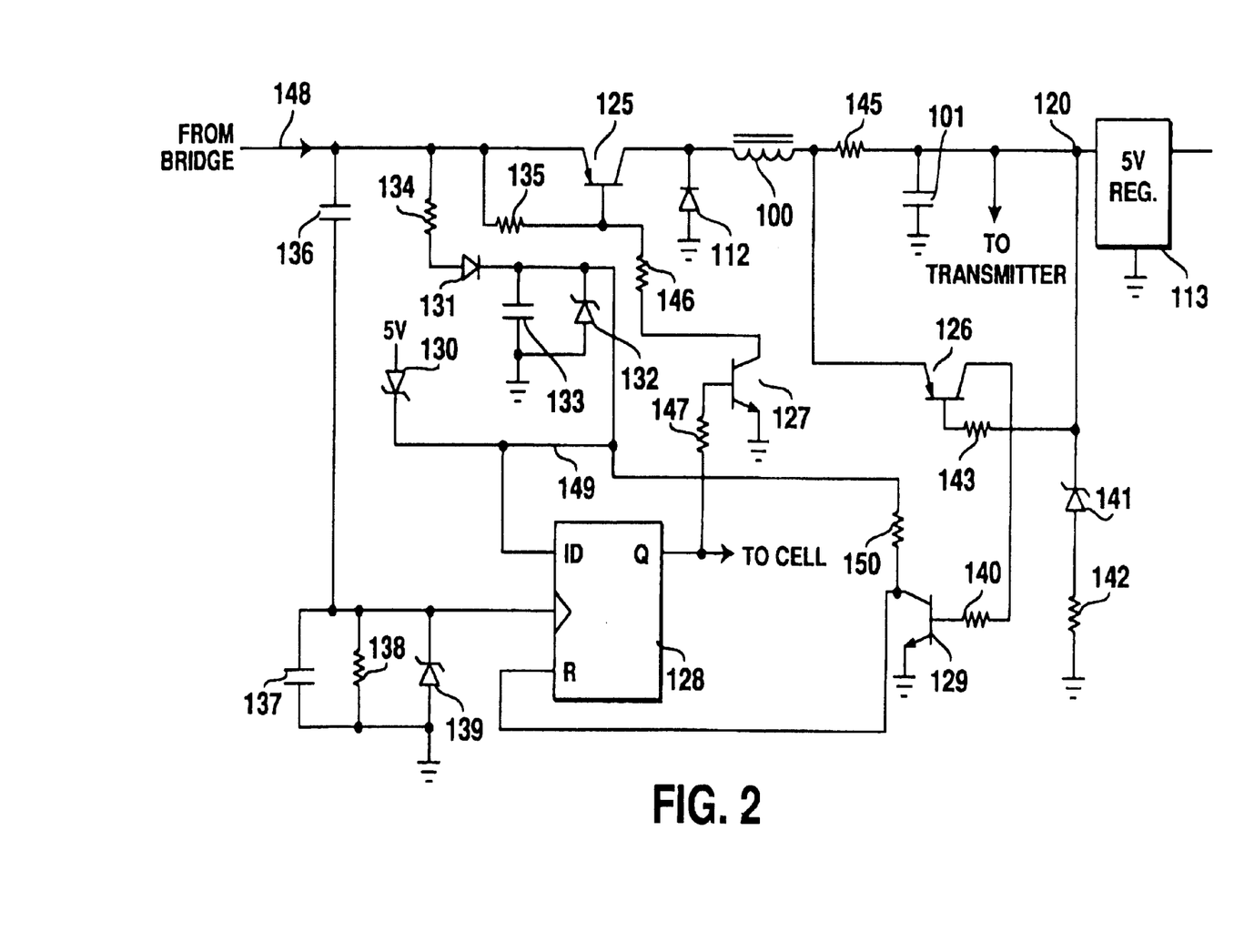
FIG. 2 is a cross sectional view taken along lines II—II in FIG. 1.

For example, as shown in FIG. 2, the small diameter inner surface 11 is formed circumferentially with a plurality of recesses 11a spaced apart from one another whereas the outer surface of each fixed side frictional plate 14 is formed circumferentially with a plurality of projections 14a which are spaced apart from one another and are fitted in the recesses 11a, respectively. Further, the outer surface 4a of the cylinder block 4 is formed circumferentially thereof with a plurality of recesses 4b spaced apart from one another whereas the inner surface of each movable side frictional plate 15 is formed circumferentially with a plurality of projections 15a which are spaced apart and are fitted in the recesses 4b, respectively.

The middle diameter inner surface 12 of the above mentioned casing 1 has mounted thereto a ring shaped stopper 16 such as a snap ring which serves to regulate and keep small the spacing between the fixed side frictional plates 14 and the movable side frictional plates.

A piston 17 is slidably accommodated within a space defined by the large diameter inner surface 13, the middle diameter inner surface 12 and the small diameter inner surface 11. The piston 17 is of a hollow stepped configuration having a large diameter base portion 18, a middle diameter intermediate portion 19 and a small diameter forward end portion 20 which are commensurate with the large diameter inner surface 13, the middle diameter inner surface 12 and the small diameter inner surface 11, respectively. Also, the large diameter base portion 18 and the middle diameter intermediate portion 19 of the piston 17 are slidably inserted into the casing 1 adjacent the large diameter inner surface 13 and the middle diameter inner surface 12 to define a piston driving pressure receiving chamber 21. The small diameter forward end portion 20 is smaller in diameter than the ring stopper 16.

A spring 22 is disposed between the above mentioned end plate and the above mentioned piston 17, and is provided to thrust the piston 17 rightwards thereby projecting the small diameter forward end portion 20 from the stopper 16 towards the frictional plates. Hence, spring 22 applies pressure thus forcing the fixed side frictional plates 14 and the movable side frictional plates 15 together. This will cause the cylinder block 4 to be fastened to the housing 3, thereby braking the cylinder block 4. On the other hand, if a pressure fluid is introduced into the piston driving pressure receiving chamber 21, the piston 17 will be thrusted leftwards against the spring 22 to detach or move apart the fixed side frictional plates 14 from the movable side frictional plates 15. This causes the cylinder block 4 to be released from braking and a non-braking state is thus established.

Figure 3:
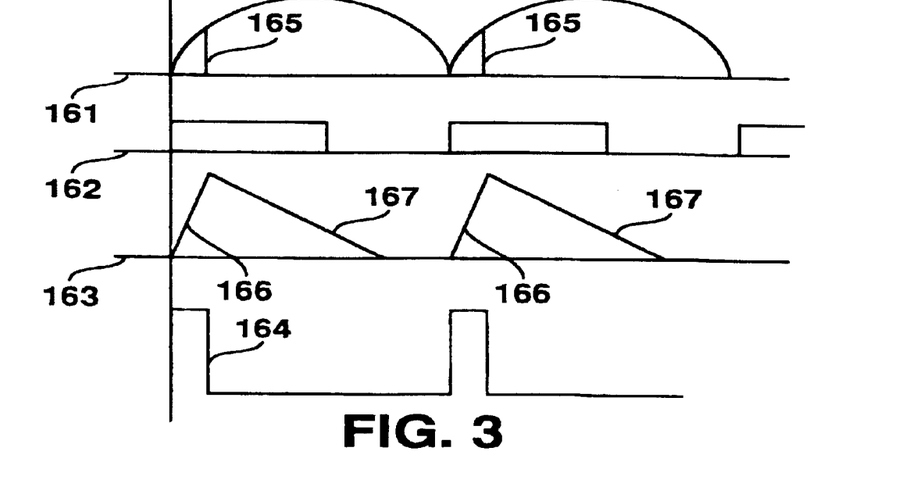
FIG. 3 is a cross sectional view taken along line III—III in FIG. 1.

The above mentioned casing 1 is formed therein with a port 23 which is, as shown in FIG. 3 of the drawings, allowed to communicate via a fluid bore 24 with the above mentioned piston driving pressure receiving chamber 21. The fluid bore 24 is provided with a slow return valve 25 which is configured to cause a poppet 27 having a narrow bore 26 to be thrusted by a spring 28 against a valve seat 24a in the fluid bore 24. Further, there are successively inserted into the poppet 27, a plurality of auxiliary poppets 30 each of which is formed therein with a narrow bore 29. In such a construction, the pressure fluid flowing from the port 23 will forcibly open the poppet 27 and the auxiliary poppets 30 so as to flow smoothly into the piston driving pressure receiving chamber 21. After flowing into the piston driving pressure receiving chamber 21 the pressure fluid may slowly flow out of piston driving pressure receiving chamber 21 into the port 23 via the narrow bores 29 and 26. It is with these components that the braking apparatus is constituted.

With the braking apparatus being so constructed, if the piston driving pressure receiving chamber 21 is supplied with the pressure fluid, the piston 17 will be moved against the force of the spring 22 and in a direction in which the forward end face 17a of the piston 17 moves away from the leftmost fixed side frictional plate 14 and reaches a position leftwards of the stopper 16. In this case, the piston 17 is moved by a relatively large distance L.

With the distance of movement of the piston being distance L, it can be seen that the piston driving pressure receiving chamber 21 will have an increased effective volume therein. Thus, since an increased amount of fluid per unit time will flow out of the piston driving pressure receiving chamber 21 when the piston 17 is thrusted by the spring 22 to bring about a braking state, it follows that the braking apparatus will be brought slowly into a braking state and as a result the period of time required for the fixed side frictional plates 14 and the movable side frictional plates 15 to come in contact can be lengthened, thus allowing the area of opening of the restriction (narrow bores) in the slow return valve 25 to remain large or at an easily manufactured size.

Also, in the non-braking state it may be noted that the front end surface 17a of the piston 17 is relatively far from the leftmost fixed side frictional plate 14. Even so, it should be noted, however, that there will still be no backlash brought about either on the fixed side frictional plates 14 or on the movable side frictional plates 15 since the spacing between the two frictional plates 14 and 15 is held at a minimum.

Figure 4:
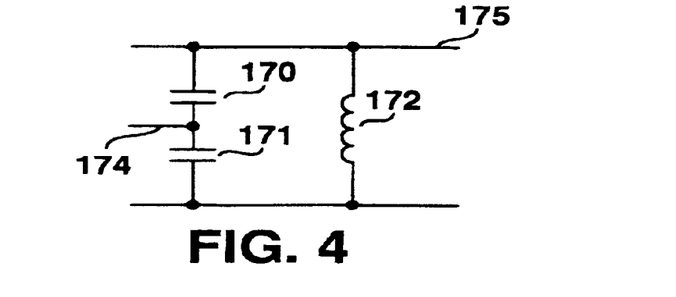
FIG. 4 is a hydraulic circuit that shows the above mentioned first embodiment of the present invention.

FIG. 4 of the drawings attached hereto shows a hydraulic circuit diagram of a first embodiment of the present invention as mentioned above. In FIG. 4, a hydraulic pump 40 has a discharge path 41 which is connected to a plurality of directional control valves 42 arranged in parallel to one another. The discharge path 41 is designed to feed a pressure fluid into an actuator, e.g., a turning purpose hydraulic motor M and an operating machine cylinder (not shown). Each of the directional control valves 42 is provided at an inlet side thereof with a pressure compensating valve 43 associated respectively therewith. Each directional control valve 42 has a check valve 44 and a pressure reduction valve 45 and is of a conventional design. Each directional control valve 42 is adapted to perform with a load pressure P of an actuator and a load pressure $P_1$ of a load pressure detecting circuit 46 corresponding thereto, a pressure compensating operation. It should be noted at this point that the load pressure detecting circuit 46 is designed to have a maximum load pressure introduced therein when a plurality of actuators are simultaneously operated.

The above mentioned load pressure detecting circuit 46 is connected via a hydraulic timer 47 to the piston driving pressure receiving chamber 21 of hydraulic motor M. The hydraulic timer 47 is constructed of a check valve 48 and a restriction 49 which together allow a load pressure of the load pressure detecting circuit 46 to be smoothly introduced into the piston driving pressure receiving chamber 21 and allow the pressure fluid in the piston driving pressure receiving chamber 21 to slowly flow out. It should be noted in this connection that the load pressure detecting circuit 46 is connected via a restriction 50 to a reservoir 51.

With the hydraulic circuit in the first embodiment being constructed in this fashion, it may be noted that when none of the directional control valves 42 are operated (i.e., each in its neutral position A), no load pressure will be generated in the load pressure detecting circuit 46 and, as a result, the pressure in the piston driving pressure receiving chamber 21 will be reduced approximately to zero. Hence, the braking apparatus will be brought into a braking state thereby applying a braking force to the turning purpose hydraulic motor M.

When one of the directional control valves 42 is operated (i.e., taking a first or a second pressure supply position B or C), a load pressure will be introduced into the load pressure detecting circuit 46. As a result, pressure fluid will then be supplied into the piston driving pressure receiving chamber 21, thus bringing the braking apparatus into a non-braking state.

Thus, with the use of the construction in which the braking apparatus is brought into a non-braking state by utilizing a load pressure that is detected when one of the directional control valves 42 is operated, the braking apparatus will automatically be brought into a non-braking state whenever the turning purpose hydraulic motor M is rotated or whenever a working machine cylinder (not shown) is operated. Likewise, the braking apparatus will automatically be brought into a braking state whenever the hydraulic motor is not rotated or whenever the working machine cylinder is not operated. It follows therefore that it becomes unnecessary to provide either a switching valve or a controller that is designed to bring the braking apparatus selectively into a braking state and a non-braking state.

It should be noted that the invention is for the purpose of hydraulically holding the upper body of a hydraulic power shovel, when it is engaged in its offset excavating operation, and that the braking apparatus is brought into a non-braking state when a working machine cylinder is operated.

More specifically, the invention is used with a hydraulic power shovel provided on a lower vehicle body. Further, an upper body of the vehicle body is turnable with a turning purpose hydraulic motor and has an excavating machine comprising a boom, an arm and a bucket. The hydraulic power shovel and the excavating machine are mounted so that each of them may be turnable upwards and downwards with a working machine cylinder. Thus, an excessive torque of rotation may act on the upper body in an offset excavating stage. Then, if the braking apparatus is in a braking state, a large force will act on the hydraulic motor (including a reduction gear assembly), possibly causing damage to the hydraulic motor or the reduction gear assembly and other problems including the emission of an abnormal sliding sound. This has hitherto necessitated hydraulically supporting the upper body by bringing the braking apparatus into a non-braking state.

Figure 5:
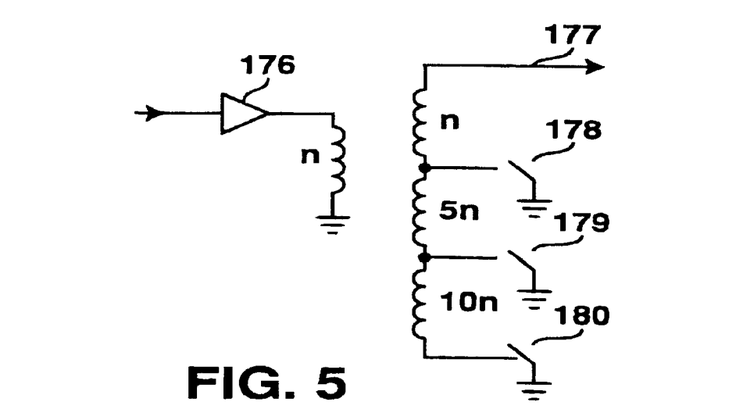
FIG. 5 is a hydraulic circuit diagram that shows a second embodiment of the braking apparatus according to the present invention.

FIG. 5 shows a hydraulic circuit of a second embodiment of the braking apparatus according to the present invention. In this case, a pilot pressure pump 52 has its discharge path 53 provided with a turning purpose hydraulic pilot valve 54 and a working machine hydraulic pilot valve 55. The hydraulic pilot valve 54 has a first and a second output circuit 56 and 57 which are connected respectively to a first and a second pressure receiving portion 42a and 42b of a directional control valve 42. The hydraulic pilot valve 55 has a third and a fourth output circuit 58 and 59 which are connected respectively to a first and a second pressure receiving portion 42a and 42b of another directional control valve 42.

Further, it should be noted that a pressure fluid (i.e., a pilot pressure fluid) in the first and second output circuits 56 and 57 mentioned above is adapted to be detected by a first shuttle valve 60 by a first sensing circuit 61. A pressure fluid in the first sensing circuit 61 and the third output circuit 58 is adapted to be detected by a second shuttle valve 62 by a second sensing circuit 63. The second sensing circuit 63 is connected via a hydraulic timer 47 to the piston driving pressure receiving chamber 21 in the braking apparatus.

With the second embodiment of the invention being so constructed, it can be seen that when the turning purpose hydraulic pilot valve 54 is operated to rotate the hydraulic motor in both normal and reverse rotary directions to furnish the first and second output circuits 56 and 57 with a pilot pressure fluid or when the working machine hydraulic pilot valve 55 is operated in one direction for an excavation to furnish the third output circuit 58 with a pilot pressure, the second sensing circuit 63 will be furnished with the pilot pressure fluid. Consequently, a pressure fluid will be furnished into the piston driving pressure receiving chamber 21 to bring the braking apparatus into a non-braking state. Therefore, the operation and effect of the previously mentioned first embodiment will be achievable here, too.

In the arrangements shown in FIGS. 4 and 5, the hydraulic pump is constructed to be of a variable capacity type in which its capacity is increased and decreased by swinging a swash plate 70 with a control piston 71. The control piston 71 is adapted to be slidable in capacity increasing and decreasing directions by a self discharge pressure that is supplied into a small diameter pressure receiving chamber 72 and a large diameter pressure receiving chamber 73. A control valve 74 allows the self discharge pressure to be supplied into the large diameter pressure receiving chamber 73 and is constructed so that it may be switchably operated by both the load pressure and the self discharge pressure.

As set out in the foregoing description, it will be appreciated that according to the present invention, by virtue of the fact that the piston driving pressure receiving chamber 21 has an increased effective volume and an increased amount of pressure fluid is allowed to flow into the piston driving pressure receiving chamber 21 in a non-braking stage, the time required for the pressure fluid in the piston driving pressure receiving chamber 21 to flow out will increase. Hence, it will take proportionally a longer amount of time before a braking state is reached.

Therefore, it can be seen that even if the area of opening of the restriction 49 which constitutes the hydraulic timer 47 is increased and the piston 17 is reduced in diameter, the braking apparatus still shifts from a non-braking state slowly to a braking state. As a result, the period of time before a braking state is reached fluctuates less and the hydraulic motor does not have to be increased in size.

It can also be seen that a braking apparatus according to the present invention makes use of a load pressure or a pilot pressure for switching from a braking state to a non-braking state and vice versa. Hence, a switching valve and so forth are unnecessary thus resulting in a reduced cost.

While the present invention has hereinbefore been set forth with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all the equivalents thereof.

What is claimed is:

1. A braking apparatus for a hydraulic motor having a housing and a cylinder block, the apparatus comprising:
    a fixed side frictional plate mounted to the housing;
    a movable side frictional plate mounted to the cylinder block;
    a movable piston operably engaged with said fixed side frictional plate and said movable side frictional plate for pressing said fixed side frictional plate and said moveable side frictional plate into pressure contact with each other;
    a spring operably engaged with said piston to thrust said piston to move in a first direction tending to establish a first state in which said fixed and movable side frictional plates are pressure contacted with each other;
    a piston driving pressure receiving chamber disposed between said housing and said piston for receiving pressure fluid to thrust said piston to move in a second direction to establish a second state in which said fixed and movable side frictional plates are detached from each other; and
    a stopper fixed to said housing to prevent said fixed side frictional plate and said movable side frictional plate from becoming spaced apart by more than a fixed maximum spacing amount, irrespective of a location of said piston,
    wherein said piston is movable in the second direction by a distance that is greater than said maximum spacing amount.

2. The braking apparatus for a hydraulic motor, as set forth in claim 1, further comprising:
    a directional control valve for supplying the hydraulic motor with the pressure fluid; and
    a sensing circuit connected to said piston driving pressure receiving chamber for detecting a load pressure from said directional control valve and for permitting said piston to be driven under the load pressure.

3. The braking apparatus for a hydraulic motor, as set forth in claim 1, further comprising:
    a directional control valve for supplying the hydraulic motor with the pressure fluid; and
    a hydraulic pilot valve having an output side connected to said piston driving pressure receiving chamber for switching said directional control valve with a pilot pressure fluid that is furnished therefrom and for permitting said piston to be driven under the pilot pressure.

4. A braking apparatus for a hydraulic motor having a housing and a cylinder block, the apparatus comprising:
    a fixed side frictional plate mounted to the housing;
    a movable side frictional plate mounted to the cylinder block;
    a movable piston operably engaged with said fixed side frictional plate and said movable side frictional plate for pressing said fixed side frictional plate and said movable said frictional plate into pressure contact with each other;
    a spring operably engaged with said piston to thrust said piston to move in a first direction tending to establish a first state in which said fixed and movable side frictional plates are pressure contacted with each other;
    a piston driving pressure receiving chamber disposed between said housing and said piston for receiving pressure fluid to thrust said piston to move in a second direction to establish a second state in which said fixed and movable side frictional plates are detached from each other; and
    a stopper fixed to said housing to regulate a spacing between said fixed side frictional plate and said movable side frictional plate;
    wherein said piston is movable in the second direction by a distance that is greater than a maximum spacing of said fixed side frictional plate and said movable side frictional plate.

5. The braking apparatus for a hydraulic motor, as set forth in claim 4, further comprising:
    a directional control valve for supplying the hydraulic motor with the pressure fluid; and
    a sensing circuit connected to said piston driving pressure receiving chamber for detecting a load pressure from said directional control valve and for permitting said piston to be driven under the load pressure.

6. The braking apparatus for a hydraulic motor, as set forth in claim 4, further comprising:
    a directional control valve for supplying the hydraulic motor with the pressure fluid; and
    a hydraulic pilot valve having an output side connected to said piston driving pressure receiving chamber for switching said directional control valve with a pilot pressure fluid that is furnished therefrom and for permitting said piston to be driven under the pilot pressure.

7. A braking apparatus for a hydraulic motor having a housing and a cylinder block, the apparatus comprising:
    a fixed side frictional plate mounted to the housing;
    a moveable side frictional plate mounted to the cylinder block;
    a piston operably engaged with said fixed side frictional plate and said movable side frictional plate for pressing said fixed side frictional plate and said movable said frictional plate into pressure contact with each other;
    a spring operably engaged with said piston to thrust said piston to move in a first direction tending to establish a first state in which said fixed and movable side frictional plates are pressure contacted with each other;
    a piston driving pressure receiving chamber disposed between said housing and said piston for receiving pressure fluid to thrust said piston to move in a second direction to establish a second state in which said fixed and movable side frictional plates are detached from each other; and
    a stopper fixed to said housing to regulate a spacing between said fixed side frictional plate and said movable side frictional plate; and wherein said piston is movable relative to said stopper.

8. The braking apparatus for a hydraulic motor, as set forth in claim 7, further comprising:

a directional control valve for supplying the hydraulic motor with the pressure fluid; and a sensing circuit connected to said piston driving pressure receiving chamber for detecting a load pressure from said directional control valve and for permitting said piston to be driven under the load pressure.

9. The braking apparatus for a hydraulic motor, as set forth in claim 7, further comprising:

a directional control valve for supplying the hydraulic motor with the pressure fluid; and a hydraulic pilot valve having an output side connected to said piston driving pressure receiving chamber for switching said directional control valve with a pilot pressure fluid that is furnished therefrom and for permitting said piston to be driven under the pilot pressure.

* * * * *

UNITED STATES PATENT AND TRADEMARK OFFICE
CERTIFICATE OF CORRECTION

PATENT NO. : 6,006,872
DATED : December 28, 1999
INVENTOR(S) : Maruta

Page 1 of 7

It is certified that error appears in the above-identified patent and that said Letters Patent is hereby corrected as shown below:

The title page, showing the illustrative figure, should be deleted and substitute therefor the attached title page.

The Drawing Sheet Sheet, consisting of Figures. 1 thru 5, should be deleted to be replaced with Drawing Sheet, consisting of Figures 1 thru 5, as shown on the attached page.

Signed and Sealed this

Ninth Day of January, 2001

Attest:

Q. TODD DICKINSON

*Attesting Officer*     *Commissioner of Patents and Trademarks*

United States Patent [19]

Maruta

[11] Patent Number: 6,006,872
[45] Date of Patent: Dec. 28, 1999

[54] BRAKING APPARATUS FOR A HYDRAULIC MOTOR

[75] Inventor: Kazuhiro Maruta, Tochigi-ken, Japan

[73] Assignee: Komatsu Ltd., Tokyo, Japan

[21] Appl. No.: 08/849,574

[22] PCT Filed: Dec. 26, 1995

[86] PCT No.: PCT/JP95/02701

§ 371 Date: Jun. 20, 1997

§ 102(e) Date: Jun. 20, 1997

[87] PCT Pub. No.: WO96/20355

PCT Pub. Date: Jul. 4, 1996

[30] Foreign Application Priority Data

Dec. 27, 1994 [JP] Japan ................... 6-325086

[51] Int. Cl.$^6$ ........................... F16D 65/24
[52] U.S. Cl. ........................... 188/170; 477/199
[58] Field of Search ................... 188/71.5, 170, 188/72.4; 477/199

[56] References Cited

U.S. PATENT DOCUMENTS

| | | | |
|---|---|---|---|
| 3,680,666 | 8/1972 | Sommer | 188/71.5 X |
| 3,759,357 | 9/1973 | Bianchetta | 188/170 X |
| 4,254,845 | 3/1981 | Braun | 188/170 X |
| 4,263,991 | 4/1981 | Morgan et al. | 188/170 |
| 4,415,067 | 11/1983 | Cory | 188/71.5 |
| 4,604,915 | 8/1986 | Soffge et al. | 188/170 X |
| 4,607,730 | 8/1986 | Paisley | 188/71.5 X |
| 4,813,518 | 3/1989 | Akiyama et al. | 188/170 |
| 5,114,324 | 5/1992 | Spindledreher | 188/170 X |
| 5,186,284 | 2/1993 | Lamela et al. | 188/170 X |
| 5,601,160 | 2/1997 | Horsch | 188/71.5 |

FOREIGN PATENT DOCUMENTS

| | | |
|---|---|---|
| 0 119 884 | 9/1984 | European Pat. Off. |
| 0 567 736 | 11/1993 | European Pat. Off. |
| 41 04 712 | 8/1992 | Germany |
| 60-87882 | 6/1985 | Japan |
| 61-6404 | 1/1986 | Japan |
| 61-93641 | 6/1986 | Japan |
| 62-100306 | 6/1987 | Japan |
| 2-126933 | 10/1990 | Japan |
| 2-248724 | 10/1990 | Japan |

Primary Examiner—Robert L. Oberleitner
Assistant Examiner—Pamela J. Lipka
Attorney, Agent, or Firm—Wenderoth, Lind & Ponack, L.L.P.

[57] ABSTRACT

A braking apparatus for a hydraulic motor has a housing and a cylinder block. The apparatus includes fixed side frictional plates mounted to the housing and movable side frictional plates mounted to the cylinder block. In addition, a piston for pressing the fixed side frictional plates against the movable side frictional plates is also provided. A spring for thrusting the piston to move in a first direction thus tending to establish a first state in which the two sets of frictional plates are pressed together is also included. Furthermore, the apparatus includes a piston driving pressure receiving chamber disposed between the housing and the piston for thrusting the piston to move in a second direction under a pressure that is introduced into the piston driving pressure receiving chamber to establish a second state in which the two sets of frictional plates are separated from each other. The apparatus also includes a stopper for regulating a space between the fixed side frictional plates and the movable side frictional plates while the piston is moving in the second direction. In addition, the piston is movable in the second direction a distance that is greater than the size of the space.

9 Claims, 3 Drawing Sheets